(12) United States Patent
Tsuchida et al.

(10) Patent No.: US 7,760,001 B2
(45) Date of Patent: Jul. 20, 2010

(54) SIGNAL PROCESSING APPARATUS

(75) Inventors: Toshiyuki Tsuchida, Kawasaki (JP); Yoshikazu Komatsu, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 14 days.

(21) Appl. No.: 12/265,225

(22) Filed: Nov. 5, 2008

(65) Prior Publication Data
US 2009/0121767 A1    May 14, 2009

(30) Foreign Application Priority Data
Nov. 8, 2007    (JP)    ............................. 2007-291044

(51) Int. Cl.
*G06F 1/06*    (2006.01)
(52) U.S. Cl. ...................... 327/295; 327/296; 327/151; 327/160
(58) Field of Classification Search ................. 327/291, 327/293, 295, 296, 141, 142, 144, 151, 154, 327/160
See application file for complete search history.

(56) References Cited

U.S. PATENT DOCUMENTS

| 5,256,994 A | 10/1993 | Langendorf |
| 5,355,502 A | 10/1994 | Schowe et al. |

FOREIGN PATENT DOCUMENTS

| JP | 09-130636 A | 5/1997 |
| JP | 2000-350119 A | 12/2000 |
| JP | 2003-087229 A | 3/2003 |
| JP | 2006-180005 A | 7/2006 |
| WO | 99/03207 A1 | 1/1999 |

*Primary Examiner*—An T Luu
(74) *Attorney, Agent, or Firm*—Sughrue Mion, PLLC

(57) ABSTRACT

The real number counter subtracts the positive integer C if the count value RC is equal to or larger than 0, or adds (the positive integer B-C) and outputs a Carry if the count value RC is negative. The first integer counter for generating the first clock f1 calculates (the count value IC1+the Carry+the positive integer A). The second integer counter 150 for generating the second clock f2 (f2=f1*G) calculates (the count value IC2+the Carry+the positive integer A+the offset value) at each input clock. The correction circuit outputs the offset value so that the second integer counter counts "the maximum count value*(f2/f1−1)*D" times more than the first integer counter with respect to each cycle D having a synchronization cycle length of the first clock f1 and the second clock f2.

20 Claims, 14 Drawing Sheets

EXEMPLARY OPERATION OF REAL NUMBER COUNTER 120

| RC+(B-C) | RC-C | RC | Carry |
|---|---|---|---|
|  |  | 0 | 0 |
| 17 | -3 | -3 | 1 |
| 14 | -6 | 14 | 0 |
| 31 | 11 | 11 | 0 |
| 28 | 8 | 8 | 0 |
| 25 | 5 | 5 | 0 |
| 22 | 2 | 2 | 0 |
| 19 | -1 | -1 | 1 |
| 16 | -4 | 16 | 0 |
| 33 | 13 | 13 | 0 |
| 30 | 10 | 10 | 0 |
| 27 | 7 | 7 | 0 |
| 24 | 4 | 4 | 0 |
| 21 | 1 | 1 | 0 |
| 18 | -2 | -2 | 1 |
| 15 | -5 | 15 | 0 |
| 32 | 12 | 12 | 0 |
| 29 | 9 | 9 | 0 |
| 26 | 6 | 6 | 0 |
| 23 | 3 | 3 | 0 |
| 20 | 0 | 0 | 0 |
| 17 | -3 | -3 | 1 |
| 14 | -6 | 14 | 0 |
| 31 | 11 | 11 | 0 |
| 28 | 8 | 8 | 0 |
| 25 | 5 | 5 | 0 |
| 22 | 2 | 2 | 0 |
| 19 | -1 | -1 | 1 |
| 16 | -4 | 16 | 0 |

while (1) { if (RC < 0) {

Carry = 1;

RC = RC + (B-C);

} else {

Carry = 0;

RC = RC-C;

}

IC1 = IC1 + A + Carry;

EXEMPLARY OPERATION OF CORRECTION CIRCUIT 160

| cnt | offset | SUM OF VALUE ADDED |
|-----|--------|--------------------|
| 0   | 65     | 65                 |
| 1   | 65     | 130                |
| 2   | 65     | 195                |
| 3   | 65     | 260                |
| :   | :      | :                  |
| 462 | 65     | 30095              |
| 463 | 65     | 30160              |
| 464 | 66     | 30226              |
| 465 | 66     | 30292              |
| 466 | 66     | 30358              |
| :   | :      | :                  |
| 996 | 66     | 65338              |
| 997 | 66     | 65404              |
| 998 | 66     | 65470              |
| 999 | 66     | 65536              |

EXAMPLE OF ATSC SYSTEM

| RESOLUTION (NUMBER OF EFFECTIVE PIXELS) | | ASPECT RATIO | SCAN MODE | FRAME RATE (Hz) | TOTAL NUMBER OF PIXELS IN ONE LINE | TOTAL NUMBER OF SCAN LINES | DotClock(MHz) |
|---|---|---|---|---|---|---|---|
| VERTICAL | HORIZONTAL | | | | | | |
| 1080 | 1920 | 16:9 | PROGRESSIVE | 29.97 | 2200 | 1125 | 74.25/1.001 |
| | | | | 30 | | | 74.25 |
| | | | INTERLACE | 59.94* | | | 74.25/1.001 |
| | | | | 60 | | | 74.25 |
| 720 | 1280 | 16:9 | PROGRESSIVE | 59.94* | 1650 | 750 | 74.25/1.001 |
| | | | | 60 | | | 74.25 |
| 480 | 640 | 4:3 | PROGRESSIVE | 59.94* | 858 | 525 | 27 |
| | | | | 60 | | | 27×1.001 |
| | | | INTERLACE | 59.94* | | | 13.5 |
| | | | | 60 | | | 13.5×1.001 |
| | 704 | 16:9/4:3 | PROGRESSIVE | 59.94* | | | 27 |
| | | | | 60 | | | 27×1.001 |
| | | | INTERLACE | 59.94* | | | 13.5 |
| | | | | 60 | | | 13.5×1.001 |

*FRAME RATE 59.94 INDICATES 60/1.001=59.94005994

|   | INPUT FREQUENCY (MHz) | FREQUENCY MULTIPLICATION NUMBER | FREQUENCY DIVISION NUMBER | OUTPUT FREQUENCY (MHz) |
|---|---|---|---|---|
| 1 | 27 | 44 | 16 | 74.25 |
| 2 | 27 | 250 | 91 | 74.25/1.001 |
| 3 | 27 | 2 | 2 | 27 |
| 4 | 27 | 1001 | 1000 | 27×1.001 |

Fig. 11

SIGNAL PROCESSING APPARATUS

BACKGROUND

1. Field of the Invention

The present invention relates to signal processing and, particularly, to a technique of signal processing necessary to generate a plurality of synchronized clocks.

2. Description of Related Art

In the MPEG (Moving Picture Coding Experts Group) system that is applied to broadcasting and communication systems, storage media and so on, a clock called an STC (System Time Clock) is used because it is necessary to play back videos and sounds in synchronization with each other. For example, in the MPEG-2 system, the frequency of an STC is defined to be 27 MHz. Thus, receiving apparatus and playback apparatus in conformity with the MPEG-2 system conduct video signal processing and audio signal processing in synchronization with a 27-MHz STC. As a technique to achieve the synchronization, a receiving end generates a clock for video signal processing and a clock for audio signal processing based on a reference clock and supplies the clocks to a video signal processing circuit and an audio signal processing circuit, respectively (cf. Japanese Unexamined Patent Application Publication No. 2003-87229).

On the other hand, various kinds of standards are operated in combination in actual broadcasting. For example, in the ATSC (Advanced Television Systems Committee), which is a digital broadcasting system in the United States, MPEG-2 TS (Transport Stream), MPEG-2 Video, AC-3 (Audio Code number 3) are employed as a multiplexing system, a video compression system and an audio compression system, respectively. Further, a large number of video systems from the traditional NTSC (National Television Standards Committee) system to the HDTV (High Definition Television) system are defined as a video system, and two kinds of field rates, 59.94 Hz and 60 Hz, which are compatible with the NTSC system, are specified, and they are operated in combination (cf. Japanese Unexamined Patent Application Publication No. 2006-180005).

FIG. 9 shows several examples of the ATSC system. As an example of the 59.94 Hz system, in the case where a broadcast signal is "the resolution: 640×480, the scan mode: progressive, the frame rate: 60/1.001 (which is shown as 59.94 in the figure) Hz" shown in FIG. 9, about 59.94 frames of video in 640×480 pixels in each frame are displayed per one second. In actuality, however, because a video signal processing circuit performs processing including a portion that is not displayed on a screen, which is called a blanking period, the number of horizontal pixels is 858 and the total number of lines is 525 including the blanking period. Accordingly, a frequency (dot clock) that is necessary for the video signal processing circuit to perform the above processing for each pixel is 27 MHz as shown in the following Expression (1):

$$858 \times 525 \times 60/1.001 = 27 \text{ MHz} \quad \text{Expression (1)}$$

Further, an example of the 60 Hz system, in the case where a broadcast signal is "the resolution: 640×480, the scan mode: progressive, the frame rate: 60 Hz" shown in FIG. 9, the necessary dot clock is 27×1.001 MHz as shown in the following Expression (2):

$$858 \times 525 \times 60 = 27 \times 1.001 \text{ MHz} \quad \text{Expression (2)}$$

In the receiving apparatus that receives broadcast signals with different dot clocks, it is necessary to generate dot clocks for the broadcast signals that are synchronized with an STC so as to deal with any of the broadcast signals.

A general method of generating a dot clock is to multiply and divide the frequency of a reference clock using a PLL (Phase-Locked Loop) circuit. In the system that aims at generating a clock synchronized with an STC, a reference clock is generally 27 MHz. Further, a technique of generating a desired clock by connecting two PLL circuits in series is disclosed in Japanese Unexamined Patent Application Publication No. 2000-350119.

Generation of various clocks in a receiving apparatus that receives broadcast signals of 59.94 Hz and 60 Hz described above is as follows.

FIG. 10 shows an example of a receiving apparatus. The receiving apparatus 1 includes a clock generator 10 that generates a reference clock, a system circuit 22, a video signal processing circuit 24, an audio signal processing circuit 26, an STC counter 30, a PLL circuit A that generates a clock to be used by the system circuit 22, a PLL circuit B that generates a clock (dot clock) to be used by the video signal processing circuit 24, and a PLL circuit C that generates a clock (audio clock) to be used by the audio signal processing circuit 26.

As described earlier, a dot clock of a video signal contained in a broadcast signal may have a plurality of different values. In the receiving apparatus 1 shown in FIG. 10, in order to deal with four kinds of dot clocks: 1: 74.25 MHz, 2: 74.25/1.001 MHz, 3: 27 MHz and 4: 27×1.001 MHz, the PLL circuit B that generates a dot clock needs to generate the four kinds of dot clocks.

FIG. 11 shows a frequency multiplication number and a frequency division number when the PLL circuit B generates the above-described four kinds of dot clocks based on the reference clock of 27 MHz. As shown therein, the frequency multiplication number and the frequency division number that are necessary for the PLL circuit B to generate the dot clock of 74.25 MHz based on the reference clock of 27 MHz are 44 and 16, respectively. The frequency multiplication number and the frequency division number are expressed hereinafter as "frequency multiplication number/frequency division number". The "frequency multiplication number/frequency division number" necessary for the PLL circuit B to generate the dot clocks of 74.25/1.001 MHz, 27 MHz and 27×1.001 MHz are "250/91", "2/2" and "1001/1000", respectively.

In the field of image processing, there is a technique called DDA (Digital Differential Analysis) that is used for drawing a line shape at high speed. The technique is applicable to generation of pulses at equal intervals (cf. Japanese Unexamined Patent Application Publication No. 9-130636)

SUMMARY

The present inventor has found the following problems. Consider, first, the PLL circuit B in the receiving apparatus 1 shown in FIG. 10. As described above, the "frequency multiplication number/frequency division number" that is necessary for the PLL circuit B to generate the dot clock of 27×1.001 MHz based on the reference clock is "1001/1000". Thus, the PLL circuit B needs to multiply the reference clock by 1001 and divide it by 1000. The PLL circuit capable of performing high multiplication by as large as 1001 times is a high-performance circuit that requires high technology for manufacturing, and it is costly and even difficult to manufacture.

The technique disclosed in Japanese Unexamined Patent Application Publication No. 2000-350119 is now applied to the receiving apparatus 1 shown in FIG. 10. FIG. 12 schematically shows a receiving apparatus 2 in such a case.

The elements of the receiving apparatus 2 shown in FIG. 12 are identical to the equivalents of the receiving apparatus 1 shown in FIG. 10 except that a PLL circuit B1 and a PLL circuit B2 replace the PLL circuit B in the receiving apparatus 1 shown in FIG. 10 and that a selector 40 is added. Thus, the PLL circuit B1 and the PLL circuit B2 are mainly described in the followings.

Referring to FIG. 12, the PLL circuit B1 generates four kinds of dot clocks: 1: 74.25 MHz, 2: 74.25/1.001 MHz, 3: 27 MHz and 4a: 43.875 MHz. The dot clocks 1 to 3 are the same as the dot clocks 1 to 3 generated by the PLL circuit B shown in FIG. 10. As shown in FIG. 12, the "frequency multiplication number/frequency division number" that is necessary for the PLL circuit B1 to generate the clock of 43.875 MHz is "13/8".

The PLL circuit B1 outputs the generated clock 4a to the PLL circuit B2. Using the clock 4a, the PLL circuit B2 generates a clock 4 of 27×1.001 MHz, which corresponds to the clock 4 generated in the PLL circuit B in the receiving apparatus 1 shown in FIG. 10. As shown in FIG. 12, the "frequency multiplication number/frequency division number" that is necessary for the PLL circuit B2 to generate the clock of 27×1.001 MHz based on the clock of 43.875 MHz is "77/125".

In this way, in order to generate the dot clock of 27×1.001 MHz based on the reference clock of 27 MHz in the receiving apparatus 2, the PLL circuit B1 and the PLL circuit clock of 43.875 MHz based on the reference clock of 27 MHz, and then the PLL circuit B2 generates the clock of 27×1.001 MHz based on the clock of 43.875 MHz. It is thereby possible to generate a desired dot clock without use of a high-performance PLL circuit capable of performing multiplication by 1001. The selector 40 selects one from the clocks 1 to 3 generated by the PLL circuit B1 and the clock 4 generated by the PLL circuit B2 according to a received signal and outputs the selected clock to the video signal processing circuit 24.

According to the technique of the receiving apparatus 2, two PLL circuits are necessary to generate the dot clocks 1 to 4. Because a PLL circuit is an analog circuit, adding a PLL circuit increases the circuit scale of the receiving apparatus 2, causing an increase in the size of an integrated circuit.

Another technique is to generate a dot clock based on a clock for a system circuit rather than based on the reference clock of 27 MHz. FIG. 13 schematically shows a receiving apparatus 3 in such a case. The elements of the receiving apparatus 3 are identical to the equivalents of the receiving apparatus 1 except that a PLL circuit A1 that generates a clock to be used by the system circuit 22 generates a clock of 351 MHz and that a PLL circuit B3 that generates dot clocks is different from the PLL circuit B in the receiving apparatus 1 shown in FIG. 10.

Referring to FIG. 13, the PLL circuit A1 multiplies the reference clock by 13 to generate the clock of 351 MHz to be used by the system circuit 22. The clock is output to the system circuit 22 and also to the PLL circuit B3.

Generally, the system circuit includes a CPU or the like and operates at a higher frequency than the video signal processing circuit and so on. Utilizing this, the PLL circuit B3 generates the above-described four kinds of clocks 1 to 4 with use of the input clock of 351 MHz. In this case, the "frequency multiplication number/frequency division number" that is necessary for the PLL circuit B3 is "44/(13×16)", "250/(13×91)", "1/(13×1)" and "77/1000".

The "frequency multiplication number/frequency division number" that is necessary for the PLL circuit B3 to generate the clock of 27×1.001 MHz is "77/1000", thus not requiring high multiplication.

In the receiving apparatus 3, however, the input frequency to the system circuit 22 is fixed to 351 MHz. This places a constraint on a use frequency in the system circuit, and if the system circuit 22 that includes a CPU or the like is speeded up, it is difficult to make a change with a frequency different from an integral multiple of 351 MHz, thus failing to flexibly deal with the modification.

In light of this, in order to generate the dot clock of 27×1.001 MHz, it is feasible to supply a reference clock (27×1.001 MHz) different from the reference clock of 27 MHz. FIG. 14 schematically shows a receiving apparatus 4 in such a case. The elements of the receiving apparatus 4 shown in FIG. 14 are identical to the equivalents of the receiving apparatus 1 shown in FIG. 10 except that a clock generator 12 and a selector 50 are added and that a PLL circuit B4 is different from the PLL circuit B.

In the receiving apparatus 4, the clock generator 12 generates a clock of 27×1.001 MHz and outputs it to the selector 50. The selector 50 selectively outputs the clock generated by the clock generator 10 or the clock generated by the clock generator 12 to the PLL circuit B4. In this configuration, the PLL circuit B4 can generate the above-described dot clocks 1 to 3 with the "frequency multiplication number/frequency division number" of "44/16", "250/91" and "1/1" using the reference clock (27 MHz) from the clock generator 10 and generate the above-described dot clock 4 with the "frequency multiplication number/frequency division number" of "1/1" using the reference clock (27×1.001 MHz) from the clock generator 12.

According to this technique, although the PLL circuit B4 is not necessarily a high-multiplication PLL, it is necessary to add the clock generator 12 that generates the clock of 27×1.001 MHz. Further, if a difference occurs in the timing to generate clocks between the clock generator 10 and the clock generator 12 due to a time lag in the setting of registers to generate clocks or if the accuracy of either one or both of the clock generator 10 and the clock generator 12 is even slightly degraded, the clocks generated by the clock generator 10 and the clock generator 12 may fail to be synchronized with each other. This adversely affects the receiving apparatus as a whole.

A first exemplary aspect of an embodiment of the present invention is a signal processing apparatus. The signal processing apparatus includes a storage section, a real number counter, a first integer counter, a first pulse generation circuit, a correction circuit, a second integer counter and a second pulse generation circuit.

The storage section stores preset positive integers A, B and C, a k-number of offset values Fi (i=1 to k) and the number of additions Ei of each offset value Fi.

The real number counter is an integer addition ring counter, and it subtracts the positive integer C if a count value is equal to or larger than 0, and adds a difference (B−C) of the positive integer B and the positive integer C and outputs a Carry if the count value is negative, at each input clock.

The first integer counter is also an integer addition ring counter, and it adds its count value IC1, the Carry output from the real number counter and the positive integer A stored in the storage section at each input clock.

The first pulse generation circuit generates a first clock with one cycle corresponding to a period for the first integer counter to return to its initial state according to the count value IC1.

The correction circuit repeatedly outputs the offset value Fi stored in the storage section in each correction period having the same length as a cycle D (D is a positive integer) of the first clock and outputs one of the offset values Fi whose number of outputs in the correction period is equal to or smaller than the number of additions Ei in synchronization with the input clock in each correction period.

The second integer counter is also an integer addition ring counter, and it adds its count value IC2, the Carry output from the real number counter, the positive integer A and the offset value output from the correction circuit at each input clock.

The second pulse generation circuit generates a second clock with one cycle corresponding to a period for the second integer counter to return to its initial state according to the count value IC2.

The frequency of the second clock is a multiple G (G>0) of the frequency of the first clock, and the positive integer D is the number of cycles of the first clock indicating a synchronization cycle length of the first clock and the second clock. Further, the positive integers A, B and C are set to satisfy the following Expression (3), and the offset value Fi and the number of additions Ei are set to satisfy the following Expressions (4) and (5):

$$f1 = f0*(A+(C/B))/(\text{a resolution of the first integer counter}) \quad \text{Expression (3)}$$

where f0 is the frequency of the input clock,
f1 is the frequency of the first clock, and
A, B and C are positive integers $$(G-1)*D = M \quad \text{Expression (4)}$$

where D is a synchronization cycle length (a positive integer) of the first clock and the second clock represented by the number of cycles of the first clock, and
M is an integer $$\Sigma[i=1^K](Ei*Fi) = (\text{a maximum count value})*(G-1)*D \quad \text{Expression (5)}$$

where D is a synchronization cycle length (a positive integer)
Fi is the offset value (an integer)
Ei is the number of additions (a positive integer) of the offset value Fi, and
K is the number of offset values Fi (a positive integer).

The implementation of the above-described apparatus as a method or a system is also effective as an exemplary aspect of an embodiment of the present invention.

According to the technique of the present invention, it is possible to generate a plurality of clocks synchronized with each other with a small circuit scale and flexibly deal with the modification of a system specification.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 2 is a view to describe a real number counter in the clock generation circuit shown in FIG. 1;

FIG. 3 is a view showing an example of a C-language description of processing performed by a real number counter and a first integer counter in the clock generation circuit shown in FIG. 1;

FIG. 5 is a view to describe a correction circuit in the clock generation circuit shown in FIG. 1;

FIG. 9 is a view showing an example of the ATSC system;

FIG. 11 is a view showing an example of a frequency multiplication number and a frequency division number in a PLL circuit in the receiving apparatus shown in FIG. 10;

DETAILED DESCRIPTION OF THE EXEMPLARY EMBODIMENTS

Before describing an exemplary embodiment of the present invention, principles of the present invention will be explained.

The present inventor conducted intensive studies for solving the above problems and established a technique of generating two clocks based on an input clock so that the two clocks are synchronized with the input clock and the frequency of one clock is not an integral multiple of the frequency of the other clock, without using a PLL circuit.

For example, if the two clocks of 27 MHz and 27×1.001 MHz that are synchronized with the input clock can be generated without using a PLL circuit, it is possible to generate not only the above-described dot clocks 1 to 3 (74.25 MHz, 74.25/1.001 MHz and 27 MHz) but also the dot clock 4 (27×1.001 MHz) based on the generated clock with a low-multiplication PLL circuit. The case of generating the two clocks that are synchronized with the input clock so that the frequency of one clock is 1.001 times the frequency of the other clock is described hereinafter by way of illustration.

Figure 1:
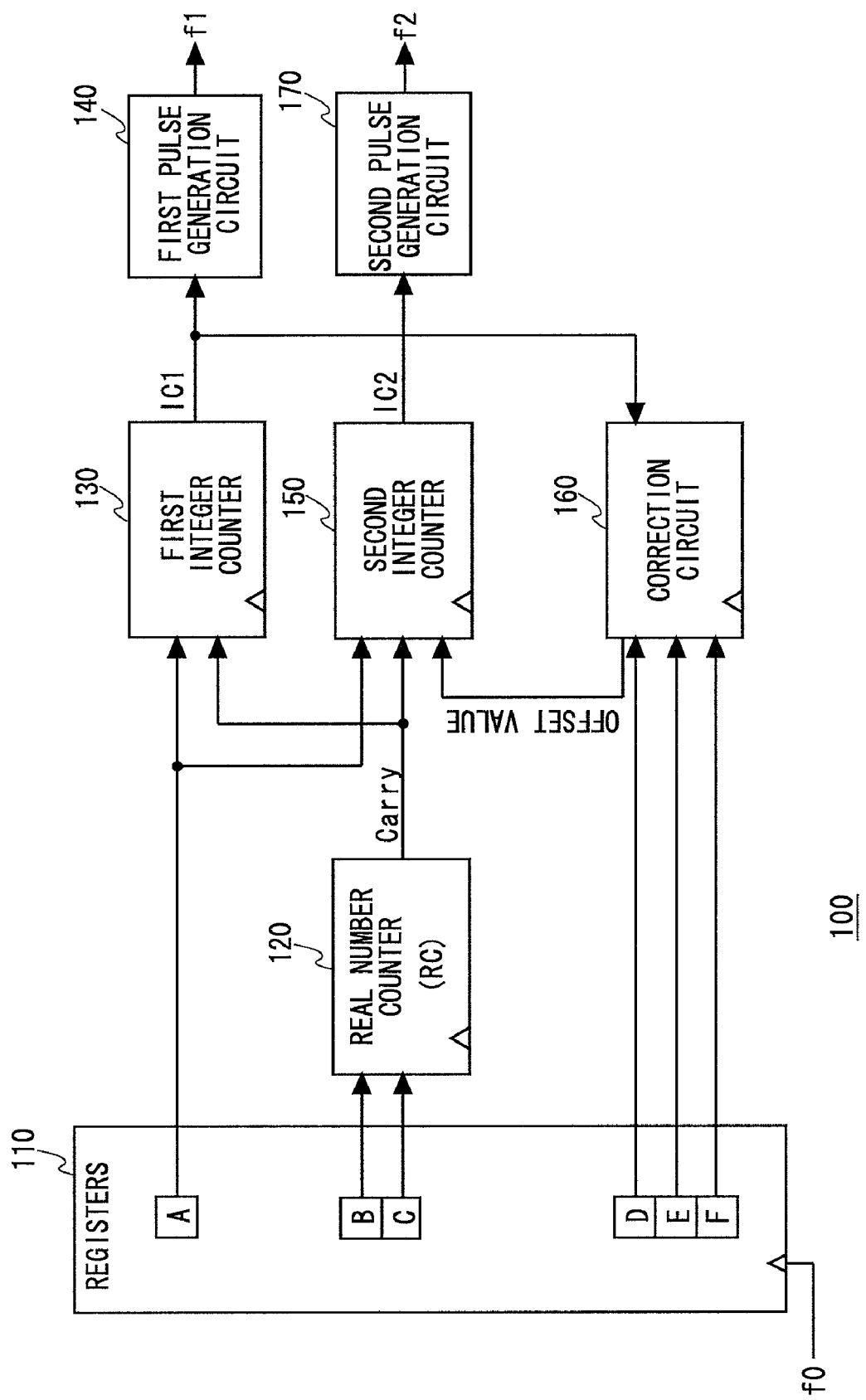
FIG. 1 is a schematic view showing a clock generation circuit according to an exemplary embodiment of the present invention.

FIG. 1 is a schematic view showing a clock generation circuit 100 according to the technique established by the present inventor. The clock generation circuit 100 generates a first clock f1 and a second clock f2 that are synchronized with an input clock f0, and the frequency of the second clock f2 is 1.001 times the frequency of the first clock f1. In the following description, the frequencies of the input clock f0, the first clock f1 and the second clock f2 are expressed as f0, f1 and f2, respectively.

Referring to FIG. 1, the clock generation circuit 100 includes registers 110, a real number counter 120, a first integer counter 130, a first pulse generation circuit 140, a second integer counter 150, a correction circuit 160, and a second pulse generation circuit 170.

The registers 110, which serve as a storage section, includes registers A to F that store preset positive integers A, B, C, D, E and an integer offset value F, respectively.

The positive integers A, B and C are set so as to satisfy the above-described Expression (3) according to the frequencies of the first clock f1 and the input clock f0.

The resolution of the integer counter indicates the bit width of the integer counter. For example, the resolution of the integer counter with a 16-bit width is 65536.

The clock generation circuit 100 generates the first clock f1 and the second clock f2 based on the input clock f0 using DDA (Digital Differential Analysis). The elements of the clock generation circuit 100 are described hereinafter with reference to FIGS. 2 to 5. The initial values of the real number counter 120, the first integer counter 130 and the second integer counter 150 are 0.

The real number counter 120 is an integer addition ring counter. At each input clock, if the count value RC of the real number counter 120 is equal to or larger than 0, the real number counter 120 subtracts the positive integer C stored in the register C from the count value RC. If, on the other hand, the count value RC is negative, the real number counter 120 adds a difference (B−C) between the positive integer B and the positive integer C to the count value RC and outputs a Carry having a value 1.

FIG. 2 shows the count value RC of the real number counter 120 and the Carry when B=20 and C=3 as an example.

Immediately after the start of the operation, RC is 0 and therefore the real number counter 120 subtracts C from RC. As a result, the count value RC becomes "−3". No Carry is generated at this time.

At the next input clock, because RC is a negative value "−3", the real number counter 120 adds (B−C) to RC. As a result, the count value RC becomes "14", and the Carry "1" is generated.

Further, at the next input clock, because RC is a positive value "14", the real number counter 120 subtracts C from RC. As a result, the count value RC becomes "11", and no Carry is generated.

The real number counter 120 repeats such processing at each input clock and thereby the count value RC changes as shown in FIG. 2. The real number counter 120 is substantially configured so as to generate an error by the value of C and, when the error exceeds the value of B, generate the Carry. Such a configuration generates the Carry C times within a loop of B times by addition and subtraction only.

The first integer counter 130 is an integer addition ring counter. At each input clock, the first integer counter 130 adds the Carry that is output from the real number counter 120 and the positive integer A that is stored in the register A to obtain a count value IC1, and it resets the count value when IC1 reaches a maximum count value.

FIG. 3 is a description of processing by the real number counter 120 and the first integer counter 130 in the C language.

If the most significant bit of the count value IC1 of the first integer counter 130 is output by such operation of the real number counter 120 and the first integer counter 130, the first clock f1 that satisfies the above-described Expression (3) can be obtained.

The first pulse generation circuit 140 generates a pulse according to the count value IC1 of the first integer counter 130. Specifically, the first pulse generation circuit 140 starts the output of Hi when IC1 becomes ½ the maximum count value and switches it to the Low output when IC1 becomes the maximum count value and the first integer counter 130 resets the count value.

Figure 4:
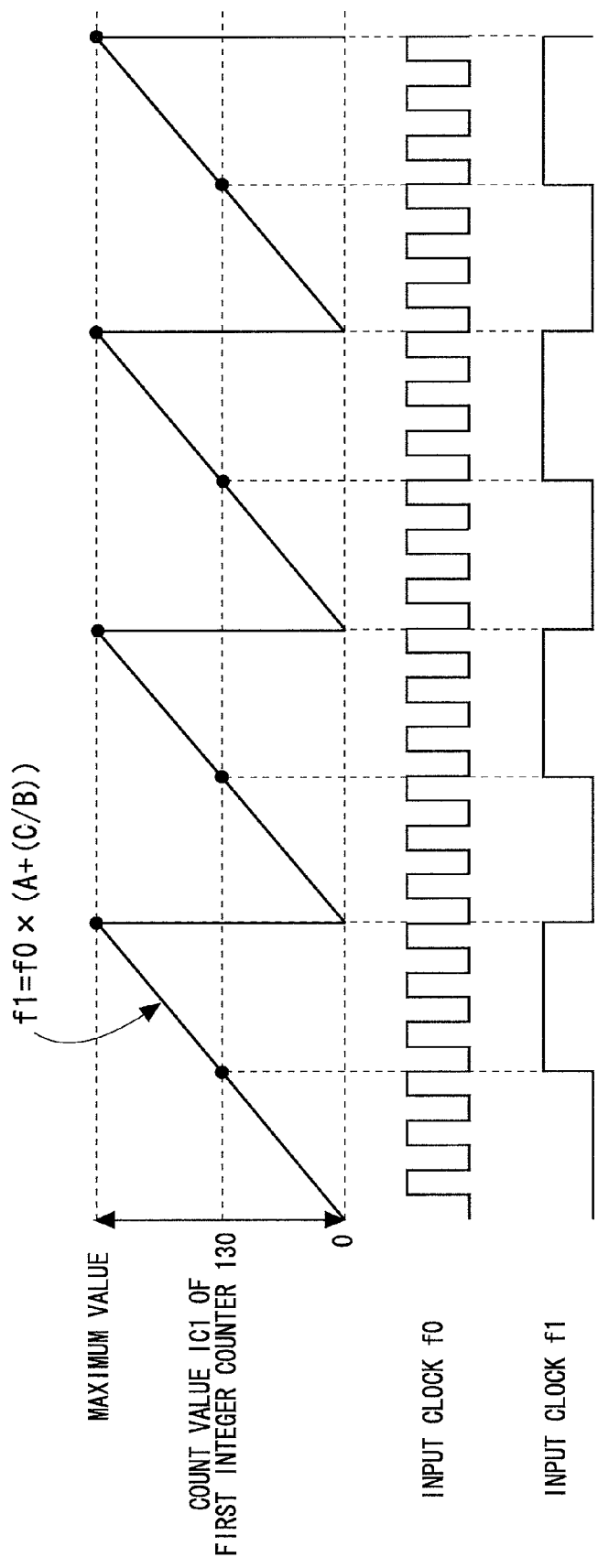
FIG. 4 is a view showing the relationship among a count value of the first integer counter, a first clock generated based on the count value and an input clock in the clock generation circuit shown in FIG. 1.

FIG. 4 shows the relationship among the count value IC1 of the first integer counter 130, the input clock f0 and the first clock f1. Referring to FIG. 4, the first integer counter 130 repeatedly counts from 0 to the maximum count value. Each time it counts, the count value is incremented by the positive integer A, and the error correction of the count value is made by the Carry that is output from the real number counter 120 C times within B times. As a result, an increase in the count value IC1 becomes approximate to a straight line having a slope (A+(C/B)). Accordingly, if the first pulse generation circuit 140 outputs the Hi clock from the time when the count value IC1 reaches ½ the maximum count value (at the time point indicated by the black circle in FIG. 4) and switches it to Low output at the time when the count value IC1 reaches the maximum count value, the first clock f1 whose one cycle corresponds to the period during which the first integer counter 130 counts from 0 to the maximum count value and that is synchronized with the input clock f0 can be obtained.

The registers D to F, the second integer counter 150, the correction circuit 160 and the second pulse generation circuit 170 are described hereinafter. Those element blocks generate the second clock f2 having the frequency that is 1.001 times the frequency of the first clock f1.

If the frequency of the second clock f2 is expressed as G (G>0) times the frequency of the first clock f1, a length of a synchronization cycle (synchronization cycle length) D during which the first clock f1 and the second clock f2 are synchronized with each other, which is expressed by the number of cycles of the first clock f1, satisfies the above-described Expression (4).

In this example, because the frequency of the second clock f2 is 1.001 times the frequency of the first clock f1, the synchronization cycle length D that satisfies Expression (4) is 1000 cycles multiplied by m (m is an integer of 1 or above). Although any value that satisfies Expression (4) may be selected as the synchronization cycle length D, it is preferred to select a minimum value. Thus, 1000 is selected as the synchronization cycle length D.

As described earlier, one cycle of the first clock f1 corresponds to the period during which the first integer counter 130 counts from 0 to the maximum count value. If there is a counter that counts at a speed of 1.001 times the speed of the first integer counter 130, by generating a pulse according to the count value using a pulse generation circuit that is similar to the first pulse generation circuit 140, it is possible to generate the second clock f2 having the frequency that is 1.001 times the frequency of the first clock f1. In order to realize the counter that counts at a speed of 1.001 times the speed of the first integer counter 130, a value that is ¹⁄₁₀₀₀ the maximum count value of the first integer counter 130 is added, in each cycle of the count value, to a count value of a counter (which is referred to hereinafter as a second counter) that counts in the same manner as the first integer counter 130. As a result, the count value of the second counter leads the count value IC1 of the first integer counter 130 by ¹⁄₁₀₀₀ cycle per one cycle, and it thus leads the count value IC1 by one cycle per 1000 cycles, which is the synchronization cycle length.

If, for example, the bit width of the first integer counter 130 is 16 bits, the first integer counter 130 counts $2^{16}$ or 65536 times per one cycle of the first clock f1. In order to realize the second integer counter that counts at a speed of 1.001 times the speed of the first integer counter 130, it is necessary to add a value of 65.536, which is ¹⁄₁₀₀₀ of 65536, to the count value of the second integer counter per one cycle of the first clock f1. However, because the value to be added is not an integer, it cannot be added to the second integer counter that is an integer addition ring counter.

In light of the foregoing, the present inventor found the following technique in order to implement the processing that is desired for the second integer counter described above with an integer addition ring counter.

The k-number of offset values Fi (i=1 to k) and the number of additions Ei of each offset value Fi are previously set so as to satisfy the above-described Expression (5), and one of the k-number of offset values Fi whose number of outputs from immediately after the reset of the first integer counter 130 is equal to or smaller than the number of additions Ei is output to the second integer counter at each input clock. A circuit that outputs the offset value in this manner is referred to hereinafter as a correction circuit. If the period equal to the cycle D of the first clock f1 is called a correction period, the correction circuit performs the above processing in each correction period.

The second integer counter adds its count value IC2, the Carry output from the real number counter 120, the positive integer A and the offset value output from the correction circuit at each input clock. When there is no output of the offset value from the correction circuit, which is after each offset value Fi is output for the number of additions Ei, the offset value is not added.

Then, a clock whose one cycle corresponds to the period between the two subsequent resets of the second integer counter is generated according to the count value IC2 of the second integer counter. The clock serves as the second clock f2.

Although the second clock f2 generated in this way contains some jitter in each cycle, it is synchronized with the first clock f1 and has a frequency that is G times the frequency of the first clock f1 in each synchronization cycle length D.

Any offset value Fi and any number of additions Ei may be set as long as Expression (5) is satisfied. It is, however, preferred to set two offset values, which are an offset value F1 that is a maximum value of integers smaller than the quotient of the maximum count value and the synchronization cycle length D and an offset value F2 that is a minimum value of integers larger than the quotient, as the offset value. Further, it is preferred to set the number of additions E1 of the offset value F1 and the number of additions E2 of the offset value F2 so that the sum of those values equals the synchronization cycle length D.

If the offset values and the numbers of additions are set in this way, the offset values to be added to the second integer counter are relatively small and substantially equal, thereby reducing the jitter of the second clock f2.

Selecting a largest possible value as the synchronization cycle length D would allow minimization of the offset value to be added to the second integer counter. However, if the synchronization cycle length D is too long, it takes a long time until the first clock f1 and the second clock f2 are synchronized. In view of this, the technique of setting a minimum value to the synchronization cycle length D and adding relatively small offset values equally one after another as described above is well-balanced.

The relationship among the offset value F1, the offset value F2, the number of additions E1 and the number of additions E2 can be represented by the following Expression (6):

$$F2 = F1 + 1$$

$$E2 = D - E1 \qquad \text{Expression (6)}$$

Therefore, it is feasible to set only the offset value F1 as the offset value and, when the offset value F2 is to be output to the second integer counter, add 1 to the offset value F1 and output it. Further, it is feasible to set only the number of additions E1 as the number of additions and, after the offset value F1 is output E1 number of times, output "the offset value F1+1" until the total number of outputs of the offset value becomes D. This reduces a register to store the offset value and the number of additions.

A further explanation is provided hereinafter with use of the above-described example. In the above example, because the multiple G is 1.001, and 1000 is selected as the synchronization cycle length D, the quotient of the maximum count value 65536 and the synchronization cycle length D is 65.536. Thus, based on Expression (4), the following expression (7) is obtained. Specifically, 65 and 66 are obtained as the offset values F1 and F2, and 464 and 536 are obtained as the number of additions E1 and E2, respectively.

$$F1*E1 + F2*E2 = 65*464 + 66*536 = 65536 \qquad \text{Expression (7)}$$

If the synchronization cycle length D (1000), the offset value F1 (65), the number of additions E1 (464) are set to the registers, and "65" is output 464 times and "65+1" is output "1000-464" times to the second integer counter per 1000 cycles as one synchronization cycle, the second integer counter counts to the maximum count value 1001 times while the first integer counter 130 counts to the maximum count value 1000 times. It is thereby possible to generate the second clock f2 having the frequency that is 1.001 times the frequency of the first clock f1 according to the count value IC2 of the second integer counter.

The second integer counter 150, the correction circuit 160 and the registers D to F in the clock generation circuit 100 shown in FIG. 1 implement the above-described processing.

The register D stores the synchronization cycle length D (1000). The register F stores the offset value F1 (65). The register E stores the number of additions E1 (464).

If the first integer counter 130 starts counting, the correction circuit 160 counts the number of times the count value IC1 of the first integer counter 130 returns to 0. If the count value cnt is equal to or smaller than the number of additions E1 (464) stored in the register E, the correction circuit 160 outputs the offset value F1 (65) stored in the register F to the second integer counter 150. If, on the other hand, the count value cnt exceeds the number of additions E1 (464), the correction circuit 160 adds 1 to the offset value F1 (65) and outputs it to the second integer counter 150. When the count value cnt reaches the synchronization cycle length D (1000) stored in the register D, the correction circuit 160 resets the count value cnt to 0 and repeats the above processing.

The period during which the count value cnt is counted from 0 to D has a length corresponding to 1000 cycles of the first clock f1, which is one correction period.

The second integer counter 150 adds its count value IC2, the positive integer A stored in the register A, the Carry output from the real number counter 120, and the offset value output from the correction circuit 160.

FIG. 5 shows the relationship among the count value cnt of the correction circuit 160, the offset value output to the second integer counter 150 and a total sum of the offset values added together in the second integer counter 150.

Referring to FIG. 5, the offset value F1 (65) is output to the second integer counter 150 during the period when the count value cnt is from 0 to 463, and "(the offset value F1+1)=66" is output to the second integer counter 150 during the period when the count value cnt is from 464 to 999. As a result that the second integer counter 150 cumulatively adds the offset values, a total sum of the offset values that are added together becomes 65536 when the count value cnt reaches 999. Thus, the second integer counter 150 counts 65536 more than the first integer counter 130 in each correction period with a length of 1000 cycles.

The second pulse generation circuit 170 generates the second clock f2 in such way that a period during which the second integer counter 150 counts from 0 to a maximum count value corresponds to one cycle of the second clock f2. The second clock f2 has the frequency that is 1.001 times the frequency of the first clock f1.

Figure 6:
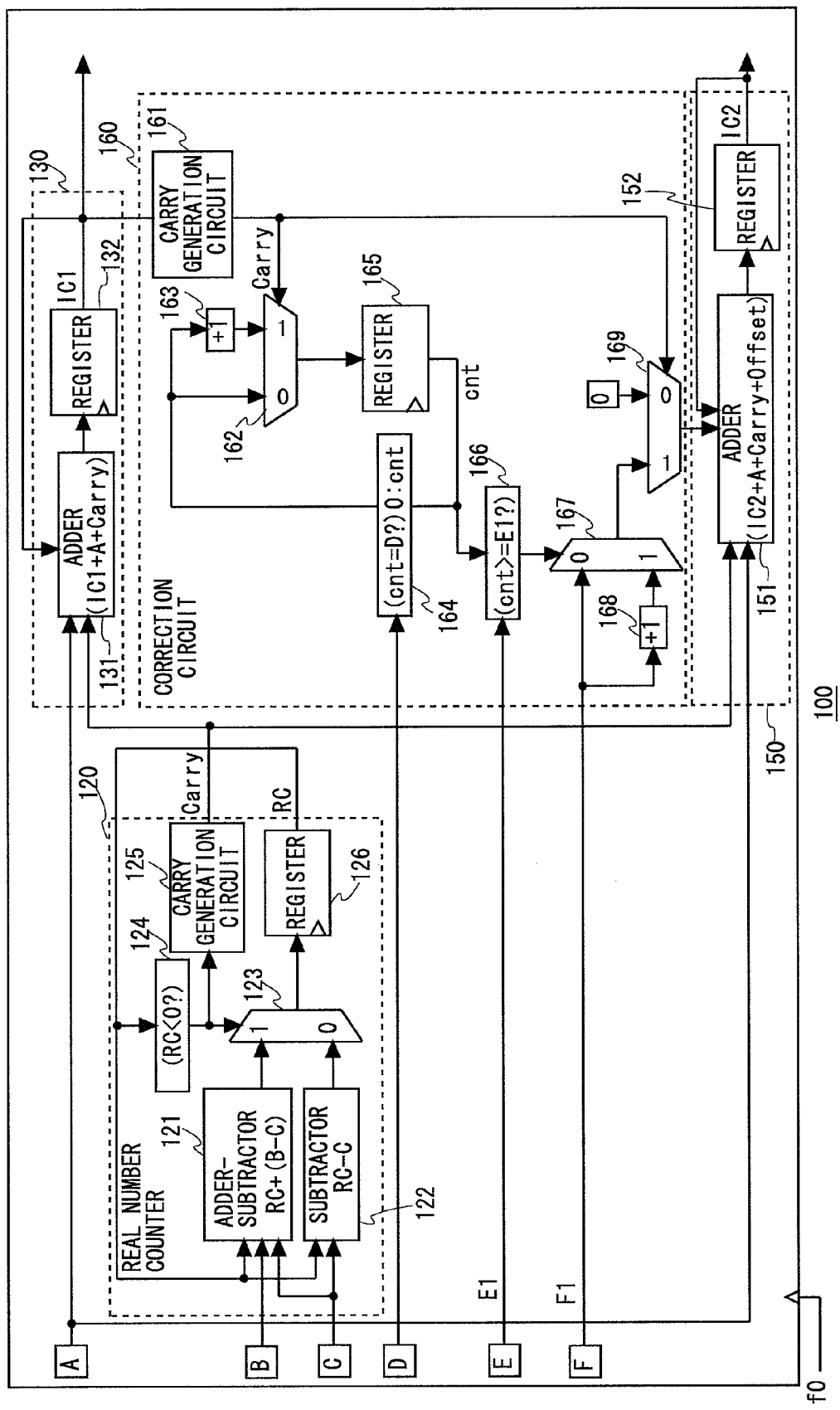
FIG. 6 is a view showing a specific circuit example of the clock generation circuit shown in FIG. 1.

FIG. 6 is a specific circuit example that implements the clock generation circuit 100 shown in FIG. 1. In FIG. 6, the first pulse generation circuit 140 and the second pulse generation circuit 170 are not illustrated for simplification.

Referring to FIG. 6, the real number counter 120 includes an adder-subtractor 121, a subtractor 122, a selector 123, a comparator 124, a carry generation circuit 125 and a register 126.

The adder-subtractor 121 conducts addition and subtraction (RC+(B−C)) on the count value RC stored in the register 126, the positive integer B stored in the register B and the positive integer C stored in the register C at each input clock and outputs the calculation result to the selector 123.

The subtractor 122 conducts calculation (RC−C) at each input clock and outputs the calculation result to the selector 123.

The comparator 124 compares the count value RC stored in the register 126 with 0 at each input clock and outputs the comparison result to the carry generation circuit 125 and the selector 123.

If, as a result of comparison by the comparator 124, the count value RC is equal to or larger than 0, the selector 123 selects the calculation result of the subtractor 122 and outputs it to the register 126. On the other hand, if the count value RC is negative, the selector 123 selects the calculation result of the adder-subtractor 121 and outputs it to the register 126.

Further, as a result of comparison by the comparator 124, if the count value RC is negative, the carry generation circuit 125 generates the Carry "1" and outputs it to the first integer counter 130 and the second integer counter 150.

Each time the selector 123 outputs either calculation result, the register 126 updates the count value RC to the calculation result.

The first integer counter 130 includes an adder 131 and a register 132. The adder 131 adds the count value IC1 stored in the register 132 and the positive integer A stored in the register A at each input clock and further adds the Carry when it is output from the carry generation circuit 125 in the real number counter 120.

The register 132 stores the calculation result of the adder 131 as a new count value IC1. The register 132 is a 16-bit register, for example, and it resets the count value IC1 to 0 when the count value IC1 reaches the maximum value of 65535.

The correction circuit 160 includes a carry generation circuit 161, a selector 162, an adder 163, a comparator 164, a register 165, a comparator 166, a selector 167, an adder 168 and a selector 169.

The carry generation circuit 161 generates the carry "1" and outputs it to the selector 162 each time the count value IC1 of the first integer counter 130 becomes 0.

The adder 163 adds "1" to the output of the comparator 164 and outputs it to the selector 162.

The comparator 164 compares the count value cnt stored in the register 165 with the synchronization cycle length D stored in the register D. If the count value cnt is smaller than the synchronization cycle length D, the comparator 164 outputs the count value cnt to the selector 162 and the adder 163. On the other hand, each time the count value cnt reaches the synchronization cycle length D, the comparator 164 outputs "0" to the selector 162 and the adder 163.

The selector 162 outputs the count value cnt from the comparator 164 when the Carry is not output from the carry generation circuit 161. On the other hand, when the Carry is output from the carry generation circuit 161, the selector 162 outputs the addition result of the adder 163, which is "the count value cnt+1".

The register 165 stores the output of the selector 162 as a new count value cnt.

Because the carry generation circuit 161 generates the Carry each time the count value IC1 of the first integer counter 130 reaches the maximum value, the count value cnt stored in the register 165 is incremented each time the count value IC1 reaches the maximum value. The count value cnt is reset when it reaches the synchronization cycle length D, and therefore the register 165 repeatedly stores 0 to the synchronization cycle length D as the count value cnt. Further, the period during which the first integer counter 130 counts from 0 to the maximum value corresponds to one cycle of the first clock f1 that is generated based on the count value IC1 of the first integer counter 130. Thus, the carry generation circuit 161, the selector 162, the adder 163, the comparator 164 and the register 165 function as a counter that counts the cycles of the first clock f1 with respect to each synchronization cycle D.

The comparator 166 compares the count value cnt stored in the register 165 with the number of additions E1 stored in the register E and outputs the comparison result to the selector 167.

The adder 168 adds 1 to the offset value F1 stored in the register F and outputs the result to the selector 167.

If, as a result of comparison by the comparator 166, the count value cnt is smaller than E1, the selector 167 outputs the offset value F1 stored in the register F to the selector 169. On the other hand, if the count value cnt is equal to or larger than E1, the selector 167 outputs "the offset value F1+1" from the adder 168 to the selector 169.

The selector 169 selects the output of the selector 167 or "0" based on the presence or absence of the Carry from the carry generation circuit 161 of the correction circuit 160. Specifically, if the Carry is not output from the carry generation circuit 161, the selector 169 outputs the offset value F1 or "the offset value F1+1" from the selector 167 to the second integer counter 150. On the other hand, if the Carry is output from the carry generation circuit 161, the selector 169 outputs "0" to the second integer counter 150.

The second integer counter 150 includes an adder 151 and a register 152. The adder 151 adds the count value IC2 stored in the register 152, the positive integer A and the output of the selector 169 and further adds the Carry when it is output from the carry generation circuit 125 in the real number counter 120.

The register 152 stores the calculation result of the adder 151 as a new count value IC2. The register 152 has the same bit width as the register 132 in the first integer counter 130, and it resets the count value IC2 to 0 when the count value IC2 reaches a maximum value of 65535, for example.

In the circuit shown in FIG. 6, the first integer counter 130 repeatedly counts from 0 to the maximum value in synchronization with the input clock. The frequency of the first clock f1 that is generated based on the count value IC1 of the first integer counter 130, whose one cycle corresponds to the count period of the first integer counter 130 from 0 to a maximum value or the period between the two subsequent resets of the first integer counter 130, satisfies the relationship represented by Expression (3) with the frequency of the input clock f0. The frequency of the first clock f1 can be any value that is equal to or smaller than ½ the frequency of the input clock f0 depending on the values of the positive integers A, B and C.

Although the second integer counter 150 also repeatedly counts from 0 to the maximum value in synchronization with the input clock, because the offset value from the correction circuit 160 is added to its count value, the second integer counter 150 counts from 0 to the maximum value (D+(G−1) *D) times while the first integer counter 130 counts from 0 to the maximum value D times. Thus, the speed that the second integer counter 150 counts from 0 to the maximum value is G times higher than the speed of the first integer counter 130.

Accordingly, the frequency of the second clock f2 that is generated based on the count value IC2 of the second integer counter 150, whose one cycle corresponds to the count period of the second integer counter 150 from 0 to the maximum value, is G times the frequency of the first clock f1.

The multiple G may be any value larger than 0 (including a decimal fraction). Thus, the technique established by the present inventor achieves generation of the first clock f1 synchronized with the input clock f0 and having a given frequency that is equal to or smaller than ½ the frequency of the input clock f0 and the second clock f2 also synchronized with the input clock f0 and having a frequency that is a given multiple G times the frequency of the first clock f1 with use of three integer counters.

Although the multiple G of 1.001, which is larger than 1, is used as a specific example in the above description, if the negative offset F is supplied from the correction circuit 160 to the second integer counter 150 when the multiple G is smaller than 1 or when (G−1) in Expression (5) is negative, the second clock having a frequency smaller than the frequency of the first clock f1 may be generated as well.

Further, although a circuit which generates two clocks (f1 and f2) that are synchronized with the input clock f0 so that the frequency of one clock is a real number multiple of the frequency of the other clock is described in the foregoing for easy understanding of the principle of the present invention, the technique of the present invention may be applied to generation of any two or more number of clocks that are synchronized with the input clock f0.

Figure 7:
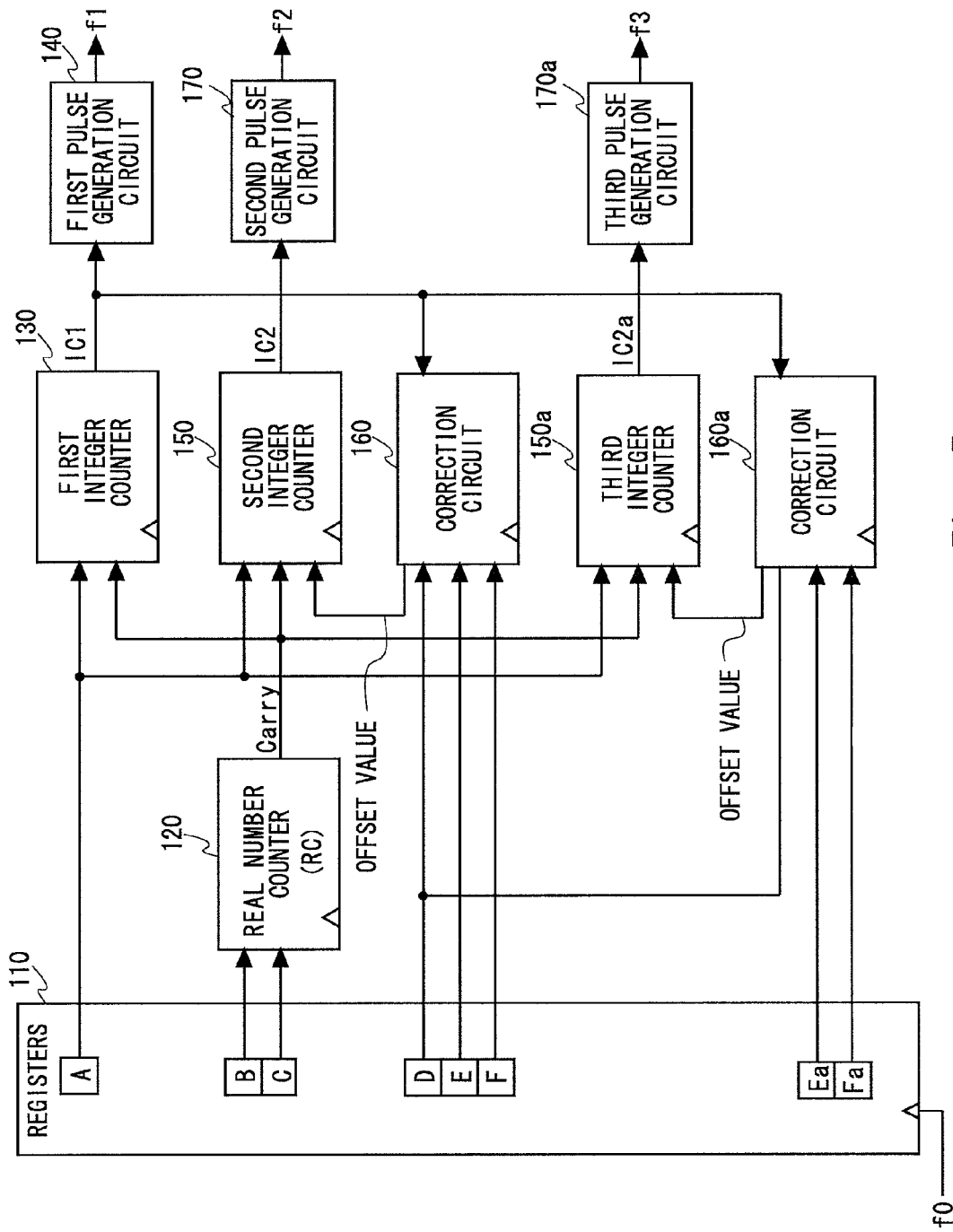
FIG. 7 is a schematic view showing another clock generation circuit according to an exemplary embodiment of the present invention.

FIG. 7 schematically shows a circuit which generates three clocks f1, f2 and f3 that are synchronized with the input clock f0 by way of illustration. In FIG. 7, the identical elements to those in the clock generation circuit 100 shown in FIG. 1 are denoted by the same reference symbols.

In the clock generation circuit shown in FIG. 7, registers Ea and Fa, a third integer counter 150a, a correction circuit 160a and a third pulse generation circuit 170a for generating a clock f3 have substantially the same functions as the registers E and F, the second integer counter 150, the correction circuit 160 and the second pulse generation circuit 170 for generating the clock f2, respectively. In this configuration, the third clock f3 synchronized with the input clock f0 and having a frequency that is different from the frequency of the second clock f2 and that is a real number multiple of the frequency of the first clock f1 can be generated according to the setting of the values of the registers Ea and Fa.

On the basis of the above description, an exemplary embodiment using the above-mentioned clock generation circuit is described hereinafter.

Figure 8:
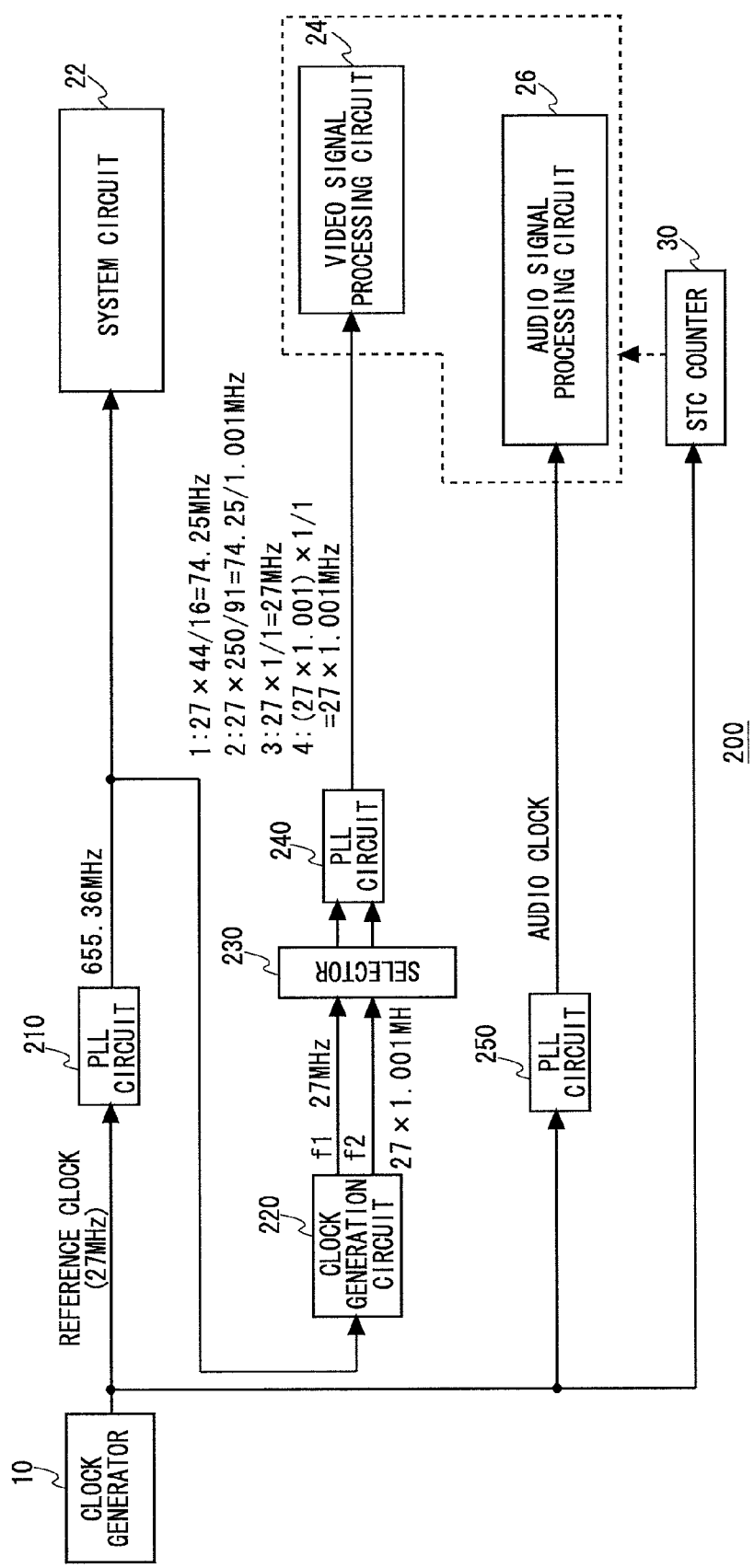
FIG. 8 is a view showing a signal processing apparatus according to an exemplary embodiment of the present invention.
Figure 10:
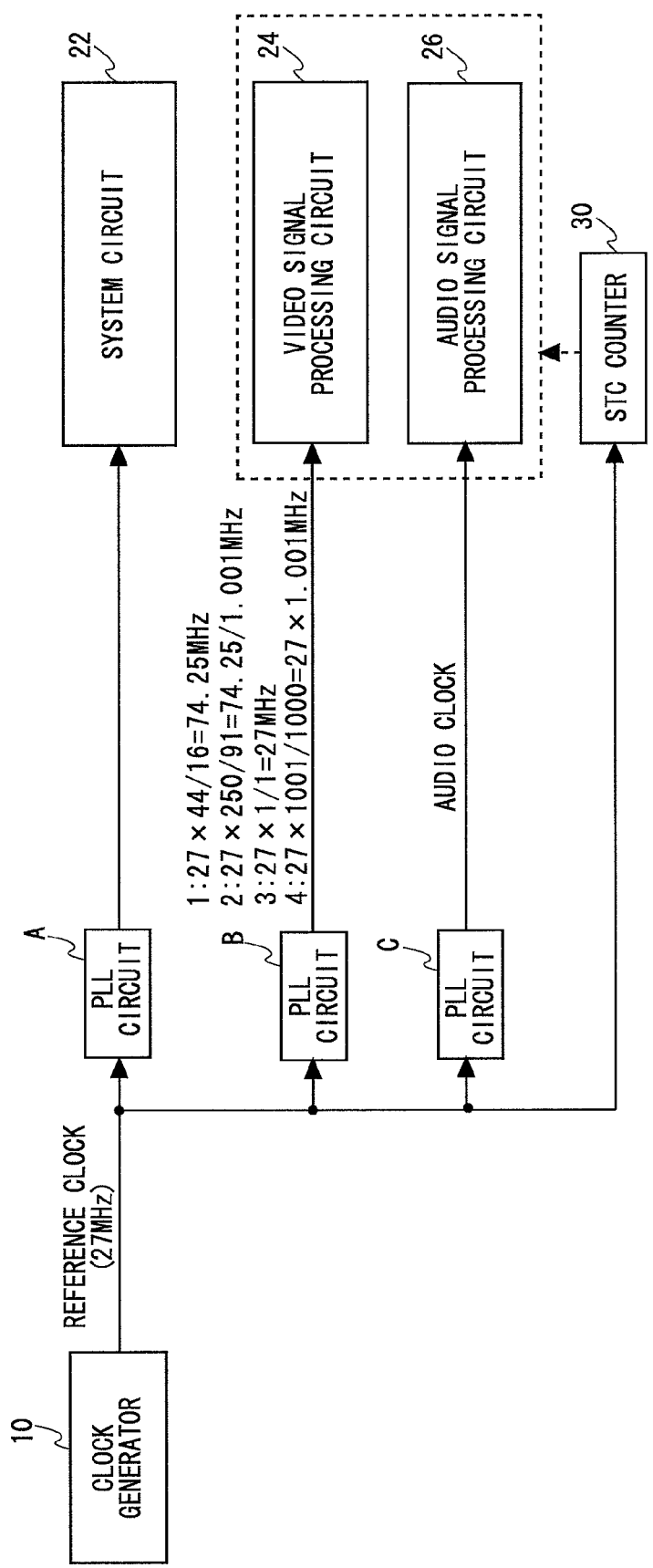
FIG. 10 is a view showing an example of a receiving apparatus.
Figure 12:
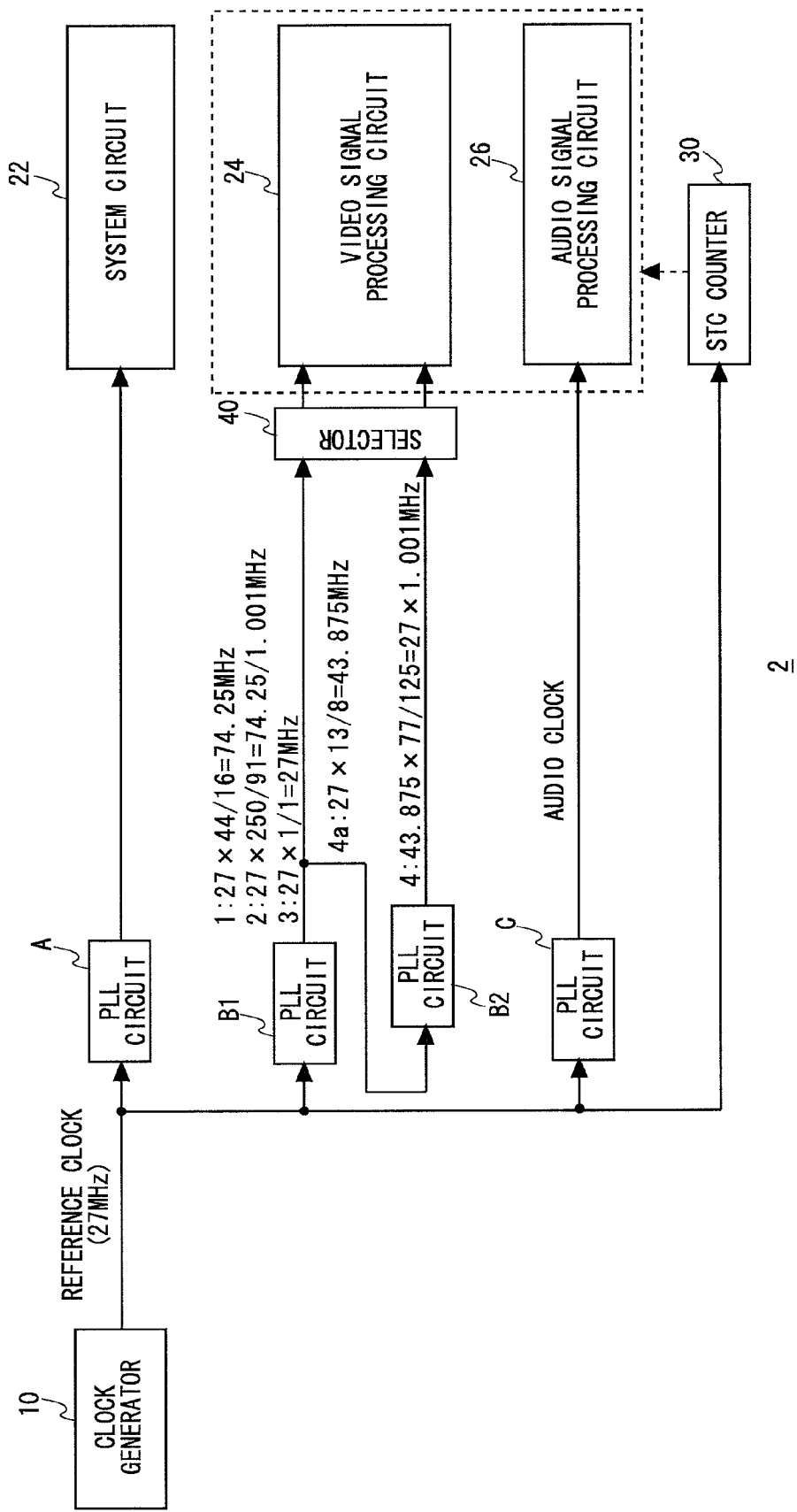
FIG. 12 is a view showing another example of a receiving apparatus.
Figure 13:
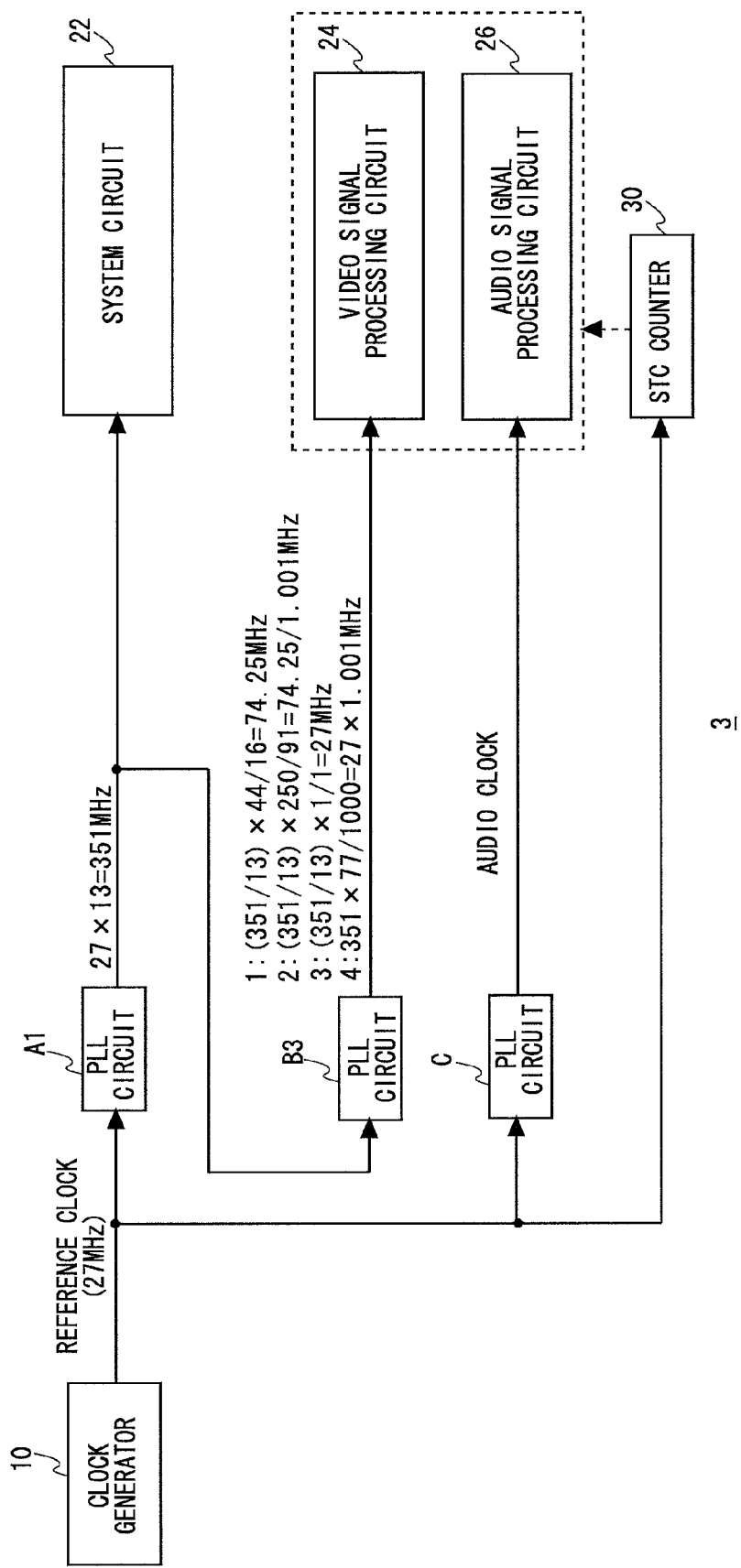
FIG. 13 is a view showing another example of a receiving apparatus.
Figure 14:
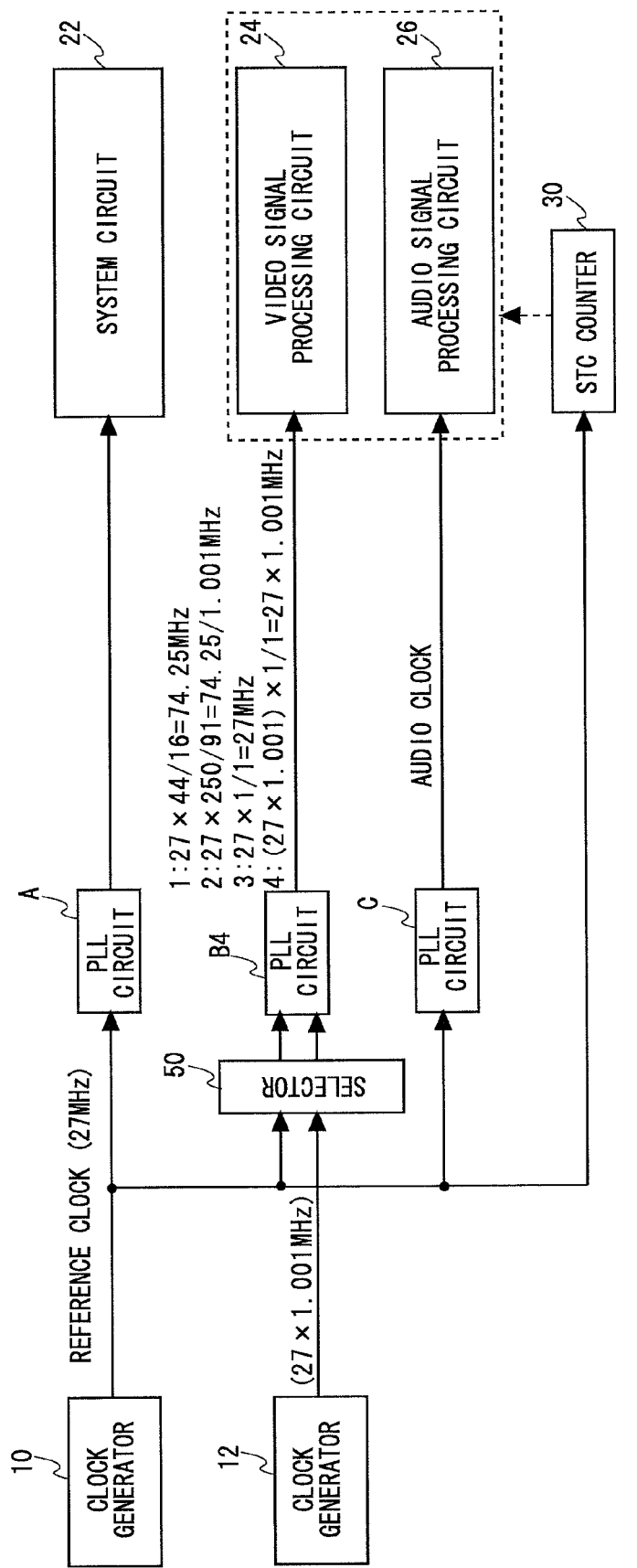
FIG. 14 is a view showing another example of a receiving apparatus.

FIG. 8 shows a signal processing circuit 200 according to an exemplary embodiment of the present invention. The signal processing circuit 200 is a receiving apparatus to receive video broadcast, for example, and it includes a clock generator 10, a PLL circuit 210, a clock generation circuit 220, a selector 230, a PLL circuit 240, a PLL circuit 250, a system circuit 22, a video signal processing circuit 24, an audio signal processing circuit 26, and an STC counter 30. For easy comparison, in FIG. 8, the same elements as those in the receiving apparatus shown in FIGS. 10, 12, 13 and 14 are denoted by the same reference symbols. In the signal processing circuit 200, like each receiving apparatus described above, it is necessary for the video signal processing circuit 24 to deal with video signals having dot clocks of 74.25 MHz, 74.25/1.001 MHz, 27 MHz and 27×1.001 MHz, for example.

The clock generator 10 generates a reference clock of 27 MHz.

The PLL circuit 210 generates a system clock to be used by the system circuit 22 and supplies it to the system circuit 22. The system clock is 655.36 MHz, for example.

The clock generation circuit 220, the selector 230 and the PLL circuit 240 generate dot clocks to be used by the video signal processing circuit 24. As described above, they need to be capable of generating all of the dot clocks of 74.25 MHz, 74.25/1.001 MHz, 27 MHz and 27×1.001 MHz.

The clock generation circuit 220 is a circuit to which the clock generation circuit 100 shown in FIG. 1 is applied, and it generates two clocks that are synchronized with the system clock generated by the PLL circuit 210, which is the input clock f0. The frequency of one of the two clocks, which is the first clock f1, is 27 MHz, and the frequency of the other clock, which is the second clock f2, is 1.001 times the frequency of the first clock f1, which is 27.027 MHz.

The clock generation circuit 220 corresponds to the clock generation circuit 100 that is described with reference to FIGS. 1 to 6 and thus not described in detail hereinbelow. The clock generation circuit 220 generates clocks of 27 MHz and 27×1.001 MHz as the first clock f1 and the second clock f2, respectively, and a multiple G is thus larger than 1. Therefore, the offset value supplied to the second integer counter for generating the second clock f2 is positive, and it is thus not necessary to add a sign bit to the offset value. Alternatively, it is feasible to generate a clock of 27.027 MHz as the first clock f1 and further generate the second clock f2 having a frequency of 1/1.001 times the frequency of the first clock f1. In this case, it is necessary to add a sign bit to the offset value supplied to the second integer counter.

The selector 230 selects the first clock f1 or the second clock f2 generated by the clock generation circuit 220 based on the kind of a video signal and outputs the selected clock to the PLL circuit 240.

The PLL circuit 240 uses the second clock f2 when it generates the dot clock 4 having a frequency of 27×1.001 MHz. In this case, the "frequency multiplication number/ frequency division number" of the PLL circuit 240 is "1/1". On the other hand, the PLL circuit 240 uses the first clock f1 when it generates any of the dot clocks 1 to 3. In this case, the "frequency multiplication number/frequency division number" for the respective dot clocks is "44/16", "250/91" and "1/1", respectively.

The PLL circuit 240 supplies the generated dot clocks to the video signal processing circuit 24.

The PLL circuit 250 generates an audio clock to be used by the audio signal processing circuit 26 based on an STC and supplies the generated audio clock to the audio signal processing circuit 26.

As described in the foregoing, in the signal processing circuit 200 according to the exemplary embodiment, the clock generation circuit 220 generates the first clock f1 of 27 MHz and the second clock f2 of 27×1.001 MHz, and the selector 230 selectively supplies either clock to the PLL circuit 240. Thus, the PLL circuit 240 does not need to perform high multiplication when generating any of the four dot clocks that are possibly used by the video signal processing circuit 24. Further, because both of the first clock f1 and the second clock f2 are synchronized with the reference clock, the clocks generated by the PLL circuit 240 are also synchronized with the system clock, the audio clock and the STC.

Further, because the clock generation circuit 220 includes an integer counter, rather than a PLL, which is an analog circuit, the circuit scale is small.

Furthermore, although the system clock generated by the PLL circuit 210 that also serves as the input clock of the clock generation circuit 220 has a frequency of 655.36 MHz as an example in the above exemplary embodiment, the clock generation circuit 220 can generate a first clock having any frequency that is equal to or smaller than ½ the frequency of the input clock by adjusting the parameters, such as the above-described positive integers A, B and C, stored in the registers. It is thereby possible to flexibly deal with the modification of a system specification such as an increase in the speed of a clock used by the system circuit 22.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A signal processing apparatus comprising:
   a storage section to store preset positive integers A, B and C, a k-number of offset values Fi (i=1 to k) and the number of additions Ei of each offset value Fi;
   a real number counter being an integer addition ring counter to subtract the positive integer C if a count value is equal to or larger than 0 and to add a difference (B−C) of the positive integer B and the positive integer C and output a Carry if the count value is negative, at each input clock;
   a first integer counter being an integer addition ring counter to add its count value IC1, the Carry output from the real number counter and the positive integer A stored in the storage section at each input clock;
   a first pulse generation circuit to generate a first clock with one cycle corresponding to a period for the first integer counter to return to its initial state according to the count value IC1;
   a correction circuit to repeatedly output the offset value Fi stored in the storage section in each correction period having the same length as a cycle D (D is a positive integer) of the first clock and output one of the offset values Fi whose number of outputs in the correction period is equal to or smaller than the number of additions Ei in synchronization with the input clock in each correction period;
   a second integer counter being an integer addition ring counter to add its count value IC2, the Carry output from the real number counter, the positive integer A and the offset value output from the correction circuit at each input clock; and
   a second pulse generation circuit to generate a second clock with one cycle corresponding to a period for the second integer counter to return to its initial state according to the count value IC2, wherein
   a frequency of the second clock is a multiple G (G>0) of a frequency of the first clock,
   the positive integer D is the number of cycles of the first clock indicating a synchronization cycle length of the first clock and the second clock,
   the positive integers A, B and C are set to satisfy Expression 1, and
   the offset value Fi and the number of additions Ei are set to satisfy Expression 2 and Expression 3:

$$f1 = f0*(A+(C/B))/(\text{a resolution of the first integer counter}) \qquad \text{Expression 1}$$

where f0 is the frequency of the input clock,
   f1 is the frequency of the first clock, and
   A, B and C are positive integers $$(G-1)*D = M \qquad \text{Expression 2}$$

where D is a synchronization cycle length (a positive integer) of the first clock and the second clock represented by the number of cycles of the first clock, and
   M is an integer $$\sum_{i=1}^{k}(Ei*Fi) = (\text{maximum count value})*(G-1)*D \qquad \text{Expression 3}$$

where D is a synchronization cycle length (a positive integer)
   Fi is the offset value (an integer)
   Ei is the number of additions (a positive integer) of the offset value Fi, and
   K is the number of offset values Fi (a positive integer).

2. The signal processing apparatus according to claim 1, wherein
   the positive integer D is a minimum value of D satisfying Expression 2.

3. The signal processing apparatus according to claim 1, wherein
   the multiple G is a real number,
   the storage section stores an offset value F1 being a maximum value of integers smaller than a quotient of the maximum count value and the positive integer D and an offset value F2 being a minimum value of integers larger than the quotient, and
   a sum of the number of additions E1 of the offset value F1 and the number of additions E2 of the offset value F2 equals the positive integer D.

4. The signal processing apparatus according to claim 2, wherein
   the multiple G is a real number,
   the storage section stores an offset value F1 being a maximum value of integers smaller than a quotient of the maximum count value and the positive integer D and an offset value F2 being a minimum value of integers larger than the quotient, and
   a sum of the number of additions E1 of the offset value F1 and the number of additions E2 of the offset value F2 equals the positive integer D.

5. The signal processing apparatus according to claim 1, wherein
   the multiple G is a real number,
   the storage section stores the positive integer D, an offset value F1 being a maximum value of integers smaller than a quotient of the maximum count value and the positive integer D and the number of additions E1 of the offset value F1, and
   the correction circuit outputs the offset value F1 in a case where the number of outputs of the offset value F1 in the correction period is equal to or smaller than the number of additions E1 and outputs "the offset value F1+1" in another case in each correction period.

6. The signal processing apparatus according to claim 2, wherein the multiple G is a real number, the storage section stores the positive integer D, an offset value F1 being a maximum value of integers smaller than a quotient of the maximum count value and the positive integer D and the number of additions E1 of the offset value F1, and the correction circuit outputs the offset value F1 in a case where the number of outputs of the offset value F1 in the correction period is equal to or smaller than the number of additions E1 and outputs "the offset value F1+1" in another case in each correction period.

7. The signal processing apparatus according to claim 1, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

8. The signal processing apparatus according to claim 2, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

9. The signal processing apparatus according to claim 3, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

10. The signal processing apparatus according to claim 4, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

11. The signal processing apparatus according to claim 5, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

12. The signal processing apparatus according to claim 6, further comprising:
a reference clock generation circuit to generate a reference clock;
a system circuit; and
a first PLL circuit to generate a system clock to be used by the system circuit using the reference clock generated by the reference clock generation circuit, wherein
the input clock is the system clock generated by the first PLL circuit.

13. The signal processing apparatus according to claim 1, further comprising:
a video signal processing circuit to process a video signal;
a selector to selectively output one of the first clock and the second clock; and
a second PLL circuit to generate a dot clock to be used by the video signal processing circuit using the clock output from the selector.

14. The signal processing apparatus according to claim 2, further comprising:
a video signal processing circuit to process a video signal;
a selector to selectively output one of the first clock and the second clock; and
a second PLL circuit to generate a dot clock to be used by the video signal processing circuit using the clock output from the selector.

15. The signal processing apparatus according to claim 3, further comprising:
a video signal processing circuit to process a video signal;
a selector to selectively output one of the first clock and the second clock; and
a second PLL circuit to generate a dot clock to be used by the video signal processing circuit using the clock output from the selector.

16. The signal processing apparatus according to claim 4, further comprising:
a video signal processing circuit to process a video signal;
a selector to selectively output one of the first clock and the second clock; and
a second PLL circuit to generate a dot clock to be used by the video signal processing circuit using the clock output from the selector.

17. The signal processing apparatus according to claim 5, further comprising:
a video signal processing circuit to process a video signal;
a selector to selectively output one of the first clock and the second clock; and
a second PLL circuit to generate a dot clock to be used by the video signal processing circuit using the clock output from the selector.

18. The signal processing apparatus according to claim 6, further comprising:
a video signal processing circuit to process a video signal;
a selector to selectively output one of the first clock and the second clock; and
a second PLL circuit to generate a dot clock to be used by the video signal processing circuit using the clock output from the selector.

19. The signal processing apparatus according to claim 7, further comprising:
a video signal processing circuit to process a video signal;
a selector to selectively output one of the first clock and the second clock; and
a second PLL circuit to generate a dot clock to be used by the video signal processing circuit using the clock output from the selector.

20. The signal processing apparatus according to claim 8, further comprising:
a video signal processing circuit to process a video signal;
a selector to selectively output one of the first clock and the second clock; and
a second PLL circuit to generate a dot clock to be used by the video signal processing circuit using the clock output from the selector.

* * * * *